US007564907B2

(12) United States Patent
Walker et al.

(10) Patent No.: US 7,564,907 B2
(45) Date of Patent: Jul. 21, 2009

(54) TECHNIQUE FOR PROVIDING SECONDARY DATA IN A SINGLE-FREQUENCY NETWORK

(75) Inventors: Glenn A. Walker, Greentown, IN (US); Joseph R. Dockemeyer, Jr., Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 637 days.

(21) Appl. No.: 11/153,696

(22) Filed: Jun. 15, 2005

(65) Prior Publication Data

US 2007/0053450 A1 Mar. 8, 2007

(51) Int. Cl.
*H04L 1/27* (2006.01)

(52) U.S. Cl. ....................... 375/260; 375/299; 375/346; 375/355

(58) Field of Classification Search ................. 375/260, 375/261, 267; 325/100, 111, 131; 455/12.1, 455/3.02
See application file for complete search history.

(56) References Cited

U.S. PATENT DOCUMENTS 5,838,799 A * 11/1998 Cioffi et al. .................... 381/2
2002/0147978 A1* 10/2002 Dolgonos et al. ............. 725/62
2004/0235419 A1* 11/2004 Michel ....................... 455/12.1
2005/0002416 A1* 1/2005 Belotserkovsky et al. ... 370/465
2005/0271053 A1* 12/2005 Nuyen et al. ................ 370/389
2006/0039312 A1* 2/2006 Walton et al. ............... 370/319
2006/0056541 A1* 3/2006 Chen et al. .................. 375/316
2006/0130099 A1* 6/2006 Rooyen ....................... 725/62

* cited by examiner

*Primary Examiner*—Chieh M Fan
*Assistant Examiner*—Qutbuddin Ghulamali
(74) *Attorney, Agent, or Firm*—Jimmy L. Funke

(57) ABSTRACT

A technique for providing secondary data in a single frequency network (SFN) provides a first forward error correcting (FEC) decoder for decoding a received coded orthogonal frequency division multiplex (COFDM) signal. A second FEC decoder is also provided for decoding a received COFDM signal. When the received COFDM signal includes valid primary data, the first FEC decoder is utilized to decode the received COFDM signal to provide general information, i.e., music, sports, etc. When a received COFDM signal includes valid secondary data, the second FEC decoder is utilized to decode the received COFDM signal to provide regional information, e.g., emergency broadcasting information. The received COFDM signal includes one or more defined COFDM symbols inserted by a transmitter of the COFDM signal to indicate the valid secondary data and the invalid primary data.

5 Claims, 3 Drawing Sheets

TECHNIQUE FOR PROVIDING SECONDARY DATA IN A SINGLE-FREQUENCY NETWORK

TECHNICAL FIELD

The present invention is generally directed to a technique for providing secondary data in a network and, more specifically, to a technique for providing secondary data in a single-frequency network.

BACKGROUND OF THE INVENTION

Various modulation techniques have been implemented to transmit digital information. For example, orthogonal frequency division multiplexing (OFDM), which spreads data to be transmitted over a large number of carriers, e.g., more than a thousand carriers, has been utilized to transmit digital information. In a system that implements OFDM modulation, the modulation symbols on each of the carriers are arranged to occur simultaneously and the carriers have a common frequency spacing, which is the inverse of the duration, called the active symbol period, over which a receiver will examine a received signal and perform the demodulation. In general, the carrier spacing ensures orthogonality of the carriers. That is, the demodulator for one carrier does not see the modulation of the other carriers in order to avoid crosstalk between carriers.

A further modulation refinement includes the concept of a guard interval. That is, each modulation symbol is transmitted for a total symbol period which is shorter than the active symbol period by a period known as the guard interval. This is employed so that the receiver experiences neither inter-symbol nor inter-carrier interference, provided that any echoes present in the signal have a delay which does not exceed the guard interval. Unfortunately, the addition of the guard interval reduces the data capacity by an amount dependent on the length of the guard interval. With OFDM it is generally possible to protect against echoes with prolonged delay by choosing a sufficient number of carriers that the guard interval need not form too great a fraction of the active symbol period. In general, the complex process of modulating (and demodulating) thousands of carriers simultaneously is equivalent to performing discrete Fourier Transform operations, for which efficient Fast Fourier Transform (FFT) algorithms exist. Thus, integrated circuit (IC) implementations of OFDM demodulators are feasible for affordable mass-produced receivers. However, uncoded OFDM is generally not satisfactory with selective channels. As such, a number of communication systems have implemented Coded Orthogonal Frequency Division Multiplexing (COFDM).

COFDM has been used for various digital broadcasting systems and is particularly tolerant to the effects of multipath, assuming a suitable guard interval is implemented. More particularly, COFDM is not limited to 'natural' multipath as it can also be used in so-called Single-Frequency Networks (SFNs). As is well known, a SFN includes multiple transmitters that radiate the same signal on the same frequency. As such, a receiver in a SFN may receive signals with different delays that combine to form a kind of 'unnatural' additional multipath. Assuming that the range of delays of the multipath (natural or 'unnatural') do not exceed the designed tolerance of the system (i.e., slightly greater than the guard interval), all of the received signal components contribute usefully to a demodulated signal.

In general, multipath (natural and unnatural) interference can be viewed in the frequency domain as a frequency selective channel response. Another frequency-dependent effect for which COFDM offers benefits is when narrow-band interfering signals are present within the signal bandwidth. COFDM systems address frequency-dependent effects by implementing forward-error correcting coding. In general, the COFDM coding and decoding is integrated in a way which is tailored to frequency-dependent channels. Metrics for COFDM are slightly more complicated than those for OFDM. For example, when data is modulated onto a single carrier in a time-invariant system then all data symbols suffer from the same noise power on average. This requires that a decision process consider random symbol-by-symbol variations that this noise causes. When data are modulated onto multiple carriers, as in COFDM, the various carriers will have different signal-to-noise ratios (SNRs). For example, a carrier which falls into a notch in the frequency response will comprise mostly noise and a carrier in a peak will generally exhibit much less noise.

Another factor, in addition to the symbol-by-symbol variations, that should be considered in the decision process is that data conveyed by carriers having a high SNR are more reliable than those conveyed by carriers having low SNR. This extra a priori information is usually known as channel-state information (CSI). The CSI concept similarly addresses interference which can affect carrier selectively, just as noise does. In general, including CSI in the generation of soft decisions is the key to the performance of COFDM in the presence of frequency-selective fading and interference.

A satellite digital audio radio service (SDARS) system is one example of a SFN. As is well known, SDARS is a relatively new satellite-based service that broadcasts audio entertainment to fixed and mobile receivers within the continental United States and various other parts of the world. Within an SDARS system, satellite-based transmissions provide the primary means of communication and terrestrial repeaters provide communication in areas where the satellite-based transmissions may be blocked. As such, a given SDARS receiver may receive the same signal, with different delays from multiple transmitters. These delayed signals may form a kind of multipath interference. Today, Sirius satellite radio and XM satellite radio are two SDARS systems that are utilized to provide satellite-based services. These SDARS systems may provide separate channels of music, news, sports, ethnic, children's and talk entertainment on a subscription-based service and may provide other services, such as email and data delivery.

In these SDARS systems, program material is transmitted from a ground station to satellites in geostationary or geosynchronous orbit over the continental United States. The satellites re-transmit the program material to earth-based satellite digital audio radio (SDAR) receivers and to terrestrial repeaters.

In many situations, it would be desirable to provide secondary data, e.g., local or regional data, to a user of an SFN, such as an SDAR system. Unfortunately, as currently designed, SDAR systems are data bandwidth limited and are not capable of providing local or regional information, e.g., emergency broadcasting information, to a user of the SDAR system.

What is needed is a technique that allows an SDAR system to provide local or regional information to a user of the system.

SUMMARY OF THE INVENTION

The present invention is generally directed to a technique for providing secondary data in a single frequency network (SFN). The technique includes providing a first forward error correcting (FEC) decoder for decoding a received coded orthogonal frequency division multiplexing (COFDM) signal. A second FEC decoder is also provided for decoding a received COFDM signal.

When the received COFDM signal includes valid primary data, the first FEC decoder is utilized to decode the received COFDM signal to provide general information. When a received COFDM signal includes valid secondary data, the second FEC decoder is utilized to decode the received COFDM signal to provide regional information. The received COFDM signal includes one or more defined COFDM symbols inserted by a transmitter of the COFDM signal to indicate the valid secondary data and invalid primary data.

According to another aspect of the present invention, the SFN is a satellite digital audio radio (SDAR) system. According to another aspect of the present invention, the primary data and the secondary data are assigned different interleavers. According to this aspect of the invention, the interleaver for the primary data may include a plurality of COFDM symbols. Additionally, the interleaver for the secondary data may include a single COFDM symbol. The COFDM signal may also include sub-modulation. The COFDM symbol may include a series of carriers that are differential quadrature phase shift key (DQPSK) modulated. The modulation of the COFDM symbol may be changed to non-uniform differential eight phase shift key (D-8PSK) or non-uniform differential quadrature amplitude modulation (DQAM).

These and other features, advantages and objects of the present invention will be further understood and appreciated by those skilled in the art by reference to the following specification, claims and appended drawings.

BRIEF DESCRIPTION OF THE DRAWINGS

The present invention will now be described, by way of example, with reference to the accompanying drawings, in which.

DESCRIPTION OF THE PREFERRED EMBODIMENTS

According to the present invention, a symbol (or a portion of a symbol) of a coded orthogonal frequency division multiplexing (COFDM) signal, provided by transmitters in a single-frequency network (SFN), is periodically replaced to provide secondary data to a satellite digital audio radio (SDAR) receiver. In this embodiment, the SDAR receiver is required to be designed to have knowledge of when the replaced COFDM symbols are transmitted. This allows the SDAR receiver to decode the replaced symbols to determine the content of the secondary data. It should be appreciated that a legacy SDAR receiver would identify the replaced COFDM symbols as random errors that would normally be corrected by a legacy forward-error correcting (FEC) algorithm. In this manner, the reception of the replaced OFDM symbols allows a compatible SDAR receiver to receive and decode secondary data, while at the same time not significantly hindering communication with legacy SDAR receivers.

Figure 1:
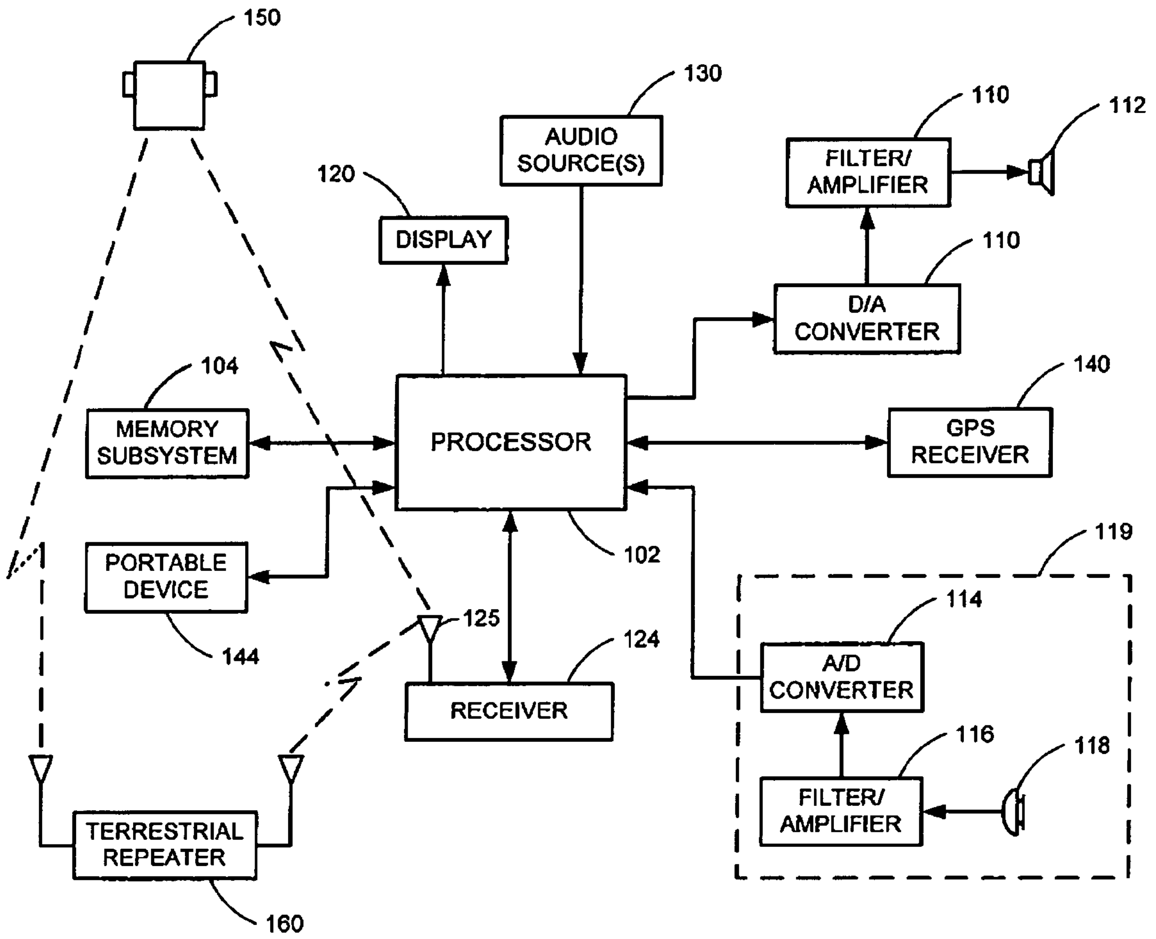
FIG. 1 depicts an exemplary electrical block diagram of an audio system implemented within a motor vehicle.

FIG. 1 depicts a block diagram of an exemplary audio system 100 that may be implemented within a motor vehicle (not shown). As shown, the system 100 includes a processor 102 coupled to a satellite digital audio radio (SDAR) receiver 124 and an audio source 130, e.g., including a compact disk (CD) player, a digital versatile disk (DVD) player, a cassette tape player an MP3 file player, and a display 120. The processor 102 may control the receiver 124 and the audio source (s) 130, at least in part, as dictated by manual or voice input supplied by a user of the system 100. In audio systems that include voice recognition technology, different users can be distinguished from each other by, for example, a voice input or a manual input.

The receiver 124 may receive, via antenna 125, multiple SDARS channels, which are provided by satellite 150 or terrestrial repeater 160, simultaneously. The processor 102 is also coupled to a portable device 144, which may include, for example, a memory stick, a flash drive, a jump drive, a smart drive, a hard disk drive an RW-CD drive, an RW-DVD drive, etc.

The processor 102 controls audio provided to a user, via audio output device 112, and may also supply various video information to the user, via the display 120. As used herein, the term processor may include a general purpose processor, a microcontroller (i.e., an execution unit with memory, etc., integrated within a single integrated circuit), an application specific integrated circuit (ASIC), a programmable logic device (PLD) or a digital signal processor (DSP). The processor 102 is also coupled to a memory subsystem 104, which includes an application appropriate amount of memory (e.g., volatile and non-volatile memory), which may provide storage for one or more speech recognition applications.

As is also shown in FIG. 1, an audio input device 118 (e.g., a microphone) is coupled to a filter/amplifier module 116. The filter/amplifier module 116 filters and amplifies the voice input provided by a user through the audio input device 118. The filter/amplifier module 116 is also coupled to an analog-to-digital (A/D) converter 114, which digitizes the voice input from the user and supplies the digitized voice to the processor 102 which may execute a speech recognition application, which causes the voice input to be compared to system recognized commands or may be used to identify a specific user. In general, the audio input device 118, the filter/amplifier module 116 and the A/D converter 114 form a voice input circuit 119.

The processor 102 may execute various routines in determining whether the voice input corresponds to a system recognized command and/or a specific operator. The processor 102 may also cause an appropriate voice output to be provided to the user through the audio output device 112. The synthesized voice output is provided by the processor 102 to a digital-to-analog (D/A) converter 108. The D/A converter 108 is coupled to a filter/amplifier section 110, which amplifies and filters the analog voice output. The amplified and filtered voice output is then provided to the audio output device (e.g., a speaker) 112. The processor 102 may also be coupled to a global position system (GPS) receiver 140, which allows the system 100 to determine the location of the receiver 140 and its associated motor vehicle.

Figure 2:
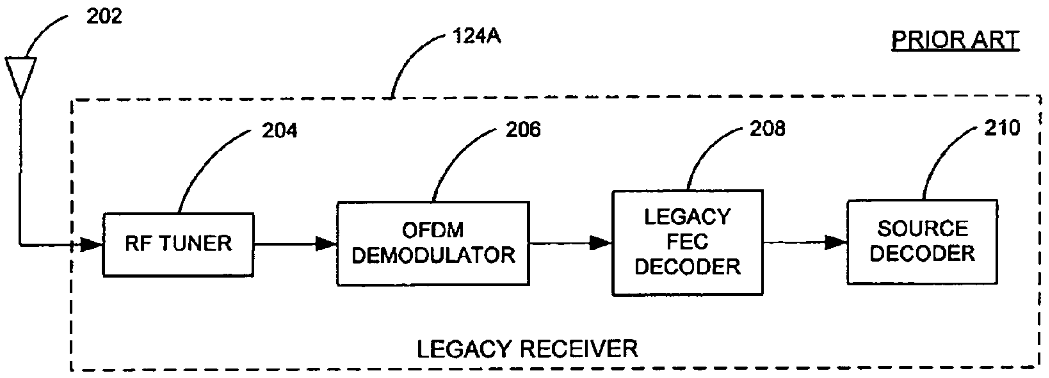
FIG. 2 depicts an exemplary electrical block diagram of a legacy satellite digital audio radio (SDAR) receiver.

FIG. 2 depicts a block diagram of a legacy SDAR receiver 200. As is shown, the receiver 200 receives a COFDM signal via antenna 202. The COFDM signal, received by the antenna 202, is provided to the RF tuner 204, whose output is provided to an orthogonal frequency division multiplexing (OFDM)

demodulator 206. The demodulator 206 provides its output to an input of a legacy FEC decoder 208. When an OFDM symbol is replaced, the legacy receiver 200 sees the replaced OFDM symbol as a random error and the decoder 208 would attempt to correct for the random error. Assuming that the decoder 208 is successful in correcting for the random error, the output of a source decoder 210 would, in general, not suffer significant degradation.

Figure 3:
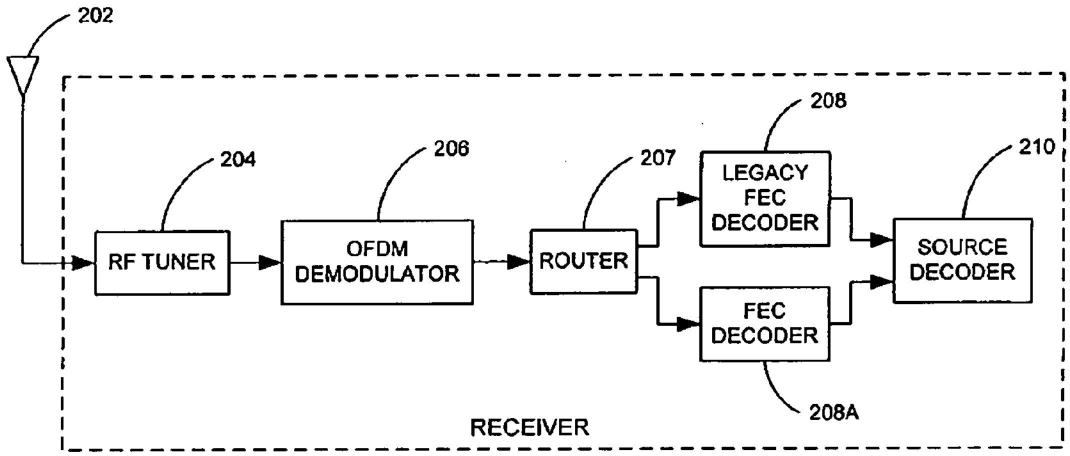
FIG. 3 depicts an exemplary electrical block diagram of a satellite digital audio radio (SDAR) receiver constructed according to one embodiment of the present invention.

As is shown in FIG. 3, an SDAR receiver 300, designed according to an embodiment of the present invention, includes both a legacy FEC decoder 208 and an FEC decoder 208A, constructed according to the present invention. The receiver 300 is similar to the receiver 200 of FIG. 2, with the exception that a router 207 provides a received COFDM signal to an appropriate one of the legacy FEC decoder 208 or the FEC decoder 208A, constructed according to the present invention. Thus, the receiver 300 determines when replaced OFDM symbols are being transmitted and decodes them using the decoder 208A, as additional data, which is then provided to the user of the system, via the source decoder 210.

Figure 4:
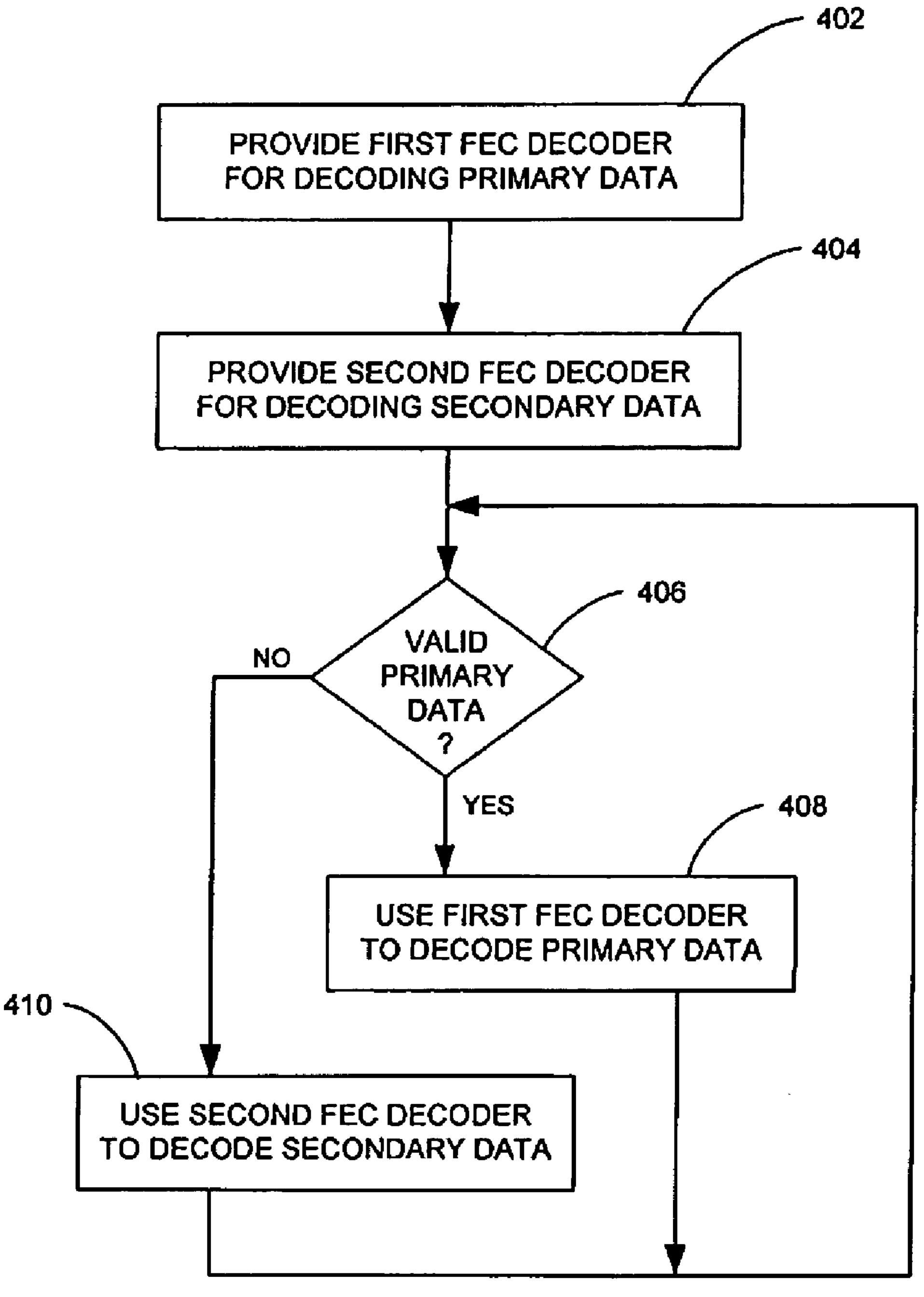
FIG. 4 depicts an exemplary flow-chart diagram of a routine for handling secondary data in the SDAR receiver of FIG. 3.

With reference to FIG. 4, an exemplary routine 400 for providing secondary data in a single frequency network (SFN) is depicted. In step 402, a first forward error correcting (FEC) decoder 208 is provided for decoding a received coded orthogonal frequency division multiplexing (COFDM) signal. As is disclosed above, an input of the first FEC decoder 208 is coupled to an OFDM demodulator 206, via a router 207. Next, in step 404, a second FEC decoder 208A is provided for decoding the received COFDM signal. As is also discussed above, an input of the second FEC decoder 208A is coupled to the OFDM demodulator 206, via the router 207. Then, in decision step 406, it is determined whether the received COFDM signal includes valid primary data. If so, control transfers to step 408, where the first FEC decoder 208 decodes the COFDM signal to provide general information. Otherwise, control transfers to step 410, where the received COFDM signal is decoded with the second FEC decoder 208A to provide regional information As noted above, valid secondary data is indicated when the received COFDM signal includes one or more defined COFDM symbols inserted by a transmitter of the COFDM signal.

The SFN may be a satellite digital audio radio (SDAR) system. In one embodiment, the primary data and the secondary data are assigned different interleavers. The interleaver for the primary data may include a plurality of COFDM symbols and the interleaver for the secondary data may include a single COFDM symbol. The COFDM symbol may include a sub-modulation. For example, the COFDM symbol may include a series of carriers that are differential quadrature phase shift key (DQPSK) modulated. In this embodiment, the modulation of the COFDM symbol may be changed to non-uniform differential eight phase shift key (D-8PSK) or non-uniform differential quadrature amplitude modulation (DQAM).

Accordingly, a technique has been described herein, which allows secondary data to be transmitted and utilized in a single frequency network, such as a satellite digital audio radio (SDAR) system. As discussed above, the secondary data may be associated with emergency broadcasting or provide other location or region specific information.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A satellite digital audio radio (SDAR) receiver, comprising:

a tuner including an input for receiving a coded orthogonal frequency division multiplexing (COFDM) signal and an output;

an orthogonal frequency division multiplexing (OFDM) demodulator including an input and an output, wherein the input of the OFDM demodulator is coupled to the output of the tuner;

a router including an input, a first output and a second output, wherein the input of the router is coupled to the output of the OFDM demodulator;

a first forward error correcting (FEC) decoder including an input coupled to the first output of the router and an output, wherein the output of the first FEC decoder is coupled to a first input of a source decoder, and wherein the first FEC decoder decodes the received COFDM signal to provide general information to the source decoder when the received COFDM signal includes valid primary data; and a second FEC decoder including an input coupled to the second output of the router, wherein the output of the second FEC decoder is coupled to a second input of the source decoder, and wherein the second FEC decoder decodes the received COFDM signal to provide regional information to the source decoder when the received COFDM signal includes valid secondary data, and invalid primary data where the received COFDM signal includes one or more defined COFDM symbols inserted by a transmitter of the COFDM signal to indicate the valid secondary data and the invalid primary data.

2. The receiver of claim 1, wherein the primary data and the secondary data are assigned different interleavers.

3. The receiver of claim 2, wherein the interleaver for the primary data includes a plurality of COFDM symbols.

4. The receiver of claim 3, wherein the interleaver for the secondary data includes a single COFDM symbol.

5. The receiver of claim 1, wherein the COFDM symbol includes a sub-modulation.

* * * * *